US009658741B2

(12) United States Patent
Pauly et al.

(10) Patent No.: US 9,658,741 B2
(45) Date of Patent: May 23, 2017

(54) MEASURING DEVICE AND MEASURING METHOD WITH INTERACTIVE OPERATION

(71) Applicant: Rohde & Schwarz GmbH & Co. KG, Munich (DE)

(72) Inventors: Andreas Pauly, Munich (DE); Thomas Braunstorfinger, Munich (DE); Angela Rieger, Munich (DE); Gerald Tietscher, Freising (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 182 days.

(21) Appl. No.: 14/312,651

(22) Filed: Jun. 23, 2014

(65) Prior Publication Data

US 2015/0309716 A1 Oct. 29, 2015

Related U.S. Application Data

(60) Provisional application No. 61/984,173, filed on Apr. 25, 2014.

(51) Int. Cl.
*G06F 3/048* (2013.01)
*G06F 3/0481* (2013.01)
*G06F 3/0484* (2013.01)

(52) U.S. Cl.
CPC ...... *G06F 3/04817* (2013.01); *G06F 3/04812* (2013.01); *G06F 3/04842* (2013.01)

(58) Field of Classification Search
CPC .................................................. G06F 3/0482
USPC ....................................................... 715/771
See application file for complete search history.

(56) References Cited

U.S. PATENT DOCUMENTS

| 7,257,509 | B2 * | 8/2007 | Pauly ................. | G01R 31/2846 340/500 |
| 8,307,331 | B2 * | 11/2012 | Warila ...................... | G06F 8/24 717/109 |
| 2004/0207637 | A1 | 10/2004 | Pauly et al. | |
| 2007/0106950 | A1 * | 5/2007 | Hutchinson ............ | G09B 5/067 715/761 |
| 2008/0313282 | A1 * | 12/2008 | Warila ...................... | G06F 8/24 709/206 |
| 2010/0281386 | A1 * | 11/2010 | Lyons ..................... | G06F 3/048 715/731 |
| 2011/0041095 | A1 * | 2/2011 | Reed ...................... | G06F 3/0481 715/834 |

(Continued)

FOREIGN PATENT DOCUMENTS

DE 10124371 A1 11/2002

*Primary Examiner* — William Titcomb
(74) *Attorney, Agent, or Firm* — Potomac Technology Law, LLC

(57) ABSTRACT

A measuring device comprises a control unit, a measuring unit, a display unit and an input unit. The measuring unit comprises a plurality of functional units and a connection unit configured for selectively connecting the plurality of functional units. The control unit is configured to control the display unit to display a plurality of function blocks each corresponding to at least one functional unit. The input unit is configured to allow a user to select one of the plurality of function blocks. The control unit is configured, after a function block is selected by the user, to control the display unit to display possible connections of the selected function block to further function blocks.

15 Claims, 15 Drawing Sheets

(56) References Cited

U.S. PATENT DOCUMENTS

2014/0006956 A1* 1/2014 Huliyar .................. G06F 3/048
715/736

* cited by examiner

MEASURING DEVICE AND MEASURING METHOD WITH INTERACTIVE OPERATION

RELATED APPLICATIONS

This application claims the benefit of the earlier filing date under 35 U.S.C. §119(e) of U.S. Provisional Application Ser. No. 61/984,173 (filed 2014 Apr. 25).

TECHNICAL FIELD

The invention relates to a measuring device, for example a network analyzer and a measuring method. A user can interactively interact with the measuring device for controlling it. Especially, the measuring device comprises functional units, which are interchangeably connected.

BACKGROUND

In the past, measuring devices had a fixed wiring of their respective components. In order to perform different measurement tasks, it was necessary to include a separate measurement path for each of these tasks within the measuring device. Each path is comprised of a number of functional units, which each are only part of one measurement path. This leads to a great number of functional units and therefore to a great hardware effort.

Moreover, the German patent application DE 101 24 371 A1 (also published as US 2004/0207637 A1) shows a measuring device comprising functional units, which can be interchangeably connected. The connection of these functional units is controlled trough a screen showing function blocks. The measuring device shown there is disadvantageous, since it is not clear to a user, which function blocks of the display can be connected to each other. A great deal of user knowledge is therefore necessary in order to operate the measuring device.

What is needed, therefore, is a measuring device and a method for operating a measuring device that facilitate a flexible and simple operation of the measuring device, without requiring a great deal of user knowledge.

SOME EXAMPLE EMBODIMENTS

Embodiments of the present invention advantageously address the foregoing requirements and needs, as well as others, by providing a measuring device and a method for operating a measuring device that facilitate a flexible and simple operation of the measuring device, without requiring a great deal of user knowledge An inventive measuring device comprises a control unit, a measuring unit, a display unit and an input unit. The measuring unit comprises a plurality of functional units and a connection unit configured for selectively connecting the plurality of functional units. The control unit is configured to control the display unit to display a plurality of function blocks each corresponding to at least one functional unit. The input unit is configured to allow a user to select one of the plurality of function blocks. The control unit is configured, after a function block is selected by the user, to control the display unit to display possible connections of the selected function block to further function blocks. Even a user with a minimal knowledge of the measuring device is therefore able to select a valid connection of function blocks.

Advantageously, the control unit is configured to control the display unit to display the possible connections by displaying the further function blocks at least partially in a first color and/or with a first texture and/or with a first appearance and displaying a cursor icon at least partially at the first color and/or with the first texture and/or with the first appearance on the display unit. After having selected the function block, the user can therefore easily see by the color and/or texture and/or appearance of the cursor and by the color and/or texture and/or appearance of function blocks, a connection is possible to, which connections are valid connections. This furthermore simplifies the operation.

Advantageously, the control unit is configured to control the display unit to display the possible connections by displaying the selected function block at least partially in a second color and/or with a second texture and/or with a second appearance and displaying the cursor icon at least partially in the second color and/or with the second texture and/or with the second appearance. After having moved the cursor icon away from the selected function block, it is thereby still possible to discern, which function block was originally selected. This furthermore increases the ease of use.

Advantageously, the control unit is configured to control the display unit to display connections of the connection unit between the functional units as connections between corresponding function blocks on the display unit and if a connection is selected, preferably by the user placing a cursor icon on or near the connection, to display a first function block connected by the selected connection in a first color and/or with a first texture and/or with a first appearance displaying a second function block connected by the selected connection in a second color and/or with the texture and/or with the second appearance and display the cursor icon at least partially in the first color and/or with the first texture and/or with the first appearance, and to display the cursor icon at least partially in the second color and/or with the second texture and/or with the second appearance. The control unit is then configured to control the connection unit to disconnect the connection between the functional units corresponding to the first function block and the second function block, if this connection is selected by the user. It is therefore easily possible to disconnect two function blocks and thereby at least two functional units.

Furthermore, advantageously the function blocks each correspond to a specific functional unit or to a combination of at least two functional units. The plurality of functional units include coders and/or baseband processors and/or faders and/or noise generators and/or mappers and/or modulators and/or radio frequency generators and/or digital outputs and/or digital inputs and/or analog outputs and/or analog inputs and/or adders and/or mixers and/or multipliers and/or connectors. A high flexibility of possible measurement tasks can thereby be achieved.

Advantageously, the plurality of function blocks include coding blocks and/or baseband blocks and/or fading blocks and/or noise blocks and/or mapping blocks and/or modulator blocks and/or radio frequency blocks and/or digital output blocks and/or digital input blocks and/or analog output blocks and/or analog input blocks. A high flexibility of possible measurement tasks is thereby achieved.

Advantageously, at least one of the plurality of function blocks corresponds to a combination of at least two functional units. The input unit is configured to allow the user to issue a command for expanding the at least one function block. The control unit is configured to display on the display unit at least two function blocks each corresponding to one of the at least two functional units of the at least one function block, if the input unit detects the user issue in the command for expanding the at least one function block. It is therefore possible to achieve a very compact view of function blocks corresponding to more than one functional unit, but if necessary to achieve a detailed view comprising all individual functional units.

Advantageously, the input unit is configured to allow a user to issue a command for condensing the at least two function blocks. The control unit is then configured to display on the display unit the at least one function block, if the input unit detects the user issuing the command for condensing the at least two function blocks. It is therefore possible to reduce the required display size, if it is not necessary to display details of the respective function block.

The input unit is advantageously configured for allowing a user to issue a context menu command corresponding to at least one function block and/or at least one graphical element displayed on the display unit. The control unit is then configured for displaying on the display unit a context menu corresponding to the at least one function block and/or graphical element, when the input unit detects the context menu command. It is therefore possible to easily access further operation dialogs by merely issuing a context menu command regarding a function block and/or a graphical element presently displayed.

Advantageously, the input unit is configured for allowing a user to issue a preview command. The control unit is then configured for displaying on the display unit a selection window for selecting different function block layouts. The input unit is in this case configured for allowing a user to issue a select command for selecting one of the function block layouts. The control unit is then furthermore configured for displaying on the display unit a preview window showing a function block layout selected in the selection window. It is therefore easily possible to change the function block layout to specified presets.

Advantageously, the control unit is configured to detect ambiguities regarding an establishment and/or a deletion of at least one connection between function blocks. The control unit is then furthermore configured to control the display unit to display a warning message and/or control the display unit to display a dialog prompting the user to clarify the ambiguity by selecting one of several options. Possible errors due to ambiguities can thereby be prevented.

An inventive measuring system comprises at least one previously described measuring device and at least one further measuring device. At least one of the plurality of function blocks corresponds to the at least one measuring device. At least one of the plurality of function blocks corresponds to the at least one further measuring device. It is thereby possible to amend the interconnection of different measuring devices within a measuring system.

An inventive measuring method comprises the steps of displaying a plurality of function blocks of a measuring device each corresponding to at least one functional unit of the measuring device on a display unit of the measuring device, selecting by a user, one of the plurality of function blocks, displaying on the display unit, possible connections of the selected function block to further function blocks of the measuring device, selecting by the user, one of the further function blocks, and establishing a connection between at least one functional unit corresponding to the function block and at least one functional unit corresponding to the selected further function block. It is thereby easily possible to control the operation of the measuring device without extensive user knowledge.

Advantageously, the method comprises displaying the possible connections by displaying the further function blocks at least partially in a first color and/or with a first texture and/or with a first appearance and displaying a cursor icon at least partially in the first color and/or with the first texture and/or with the first appearance on the display unit. The ease of operation is thereby even further increased.

Advantageously, the method furthermore comprises displaying the selected function block at least partially in a second color and/or with a second texture and/or with a second appearance and displaying the cursor icon at least partially in the second color and/or with the second texture and/or with the second appearance. A further increase in ease of use is thereby achieved.

BRIEF DESCRIPTION OF THE DRAWINGS

These and other features, aspects and advantages of the present invention will become better understood with regard to the following description, appended claims and accompanying drawings where:

DETAILED DESCRIPTION

Figure 1:
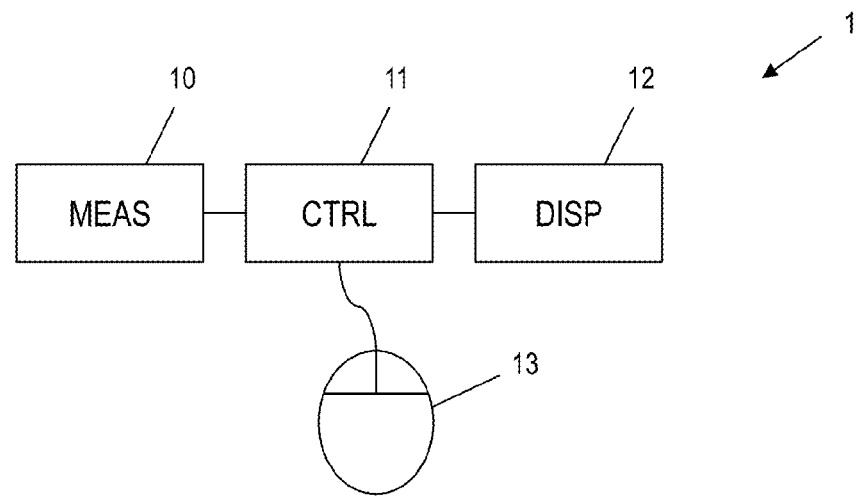
FIG. 1 illustrates a first example block diagram depicting a measuring device, in accordance with example embodiments of the present invention.
Figure 2:
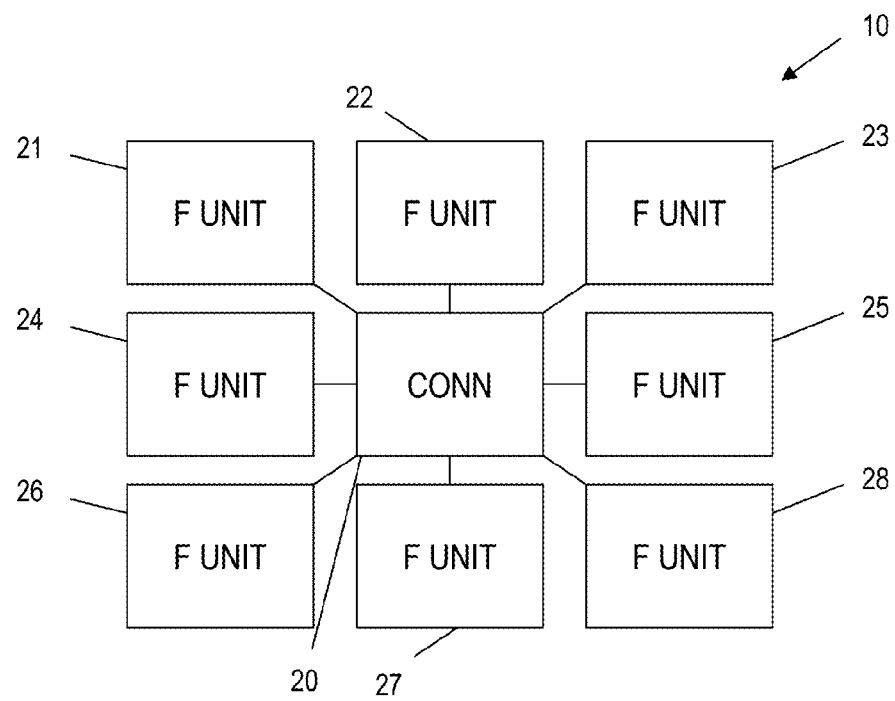
FIG. 2 illustrates a second example block diagram depicting a measuring device, in accordance with example embodiments of the present invention.

With reference to FIGS. 1-2, the general construction and function of a measuring device in accordance with example embodiments is described. With reference to FIGS. 3-15, details of the functioning with respect to the measuring device inputs and display in accordance with example embodiments are then described. Further, with reference to FIG. 16, the operation of a measuring device in accordance with example embodiments is described.

Reference will now be made in detail to the preferred embodiments of the present invention, examples of which are illustrated in the accompanying drawings. However, the following embodiments of the present invention may be variously modified and the range of the present invention is not limited by the following embodiments.

FIG. 1 illustrates a first example block diagram depicting a measuring device, in accordance with example embodiments of the present invention. The measuring device 1 comprises a measuring unit 10, which is connected to a control unit 11, which again is connected to a display unit 12 and to an input unit 13. The control unit 11 controls the measuring unit 10 and the display unit 12. Inputs by the input unit 13 are processed by the control unit 11.

Functional units, which are part of the measuring unit 10 are connected by a connection unit, which is also part of the measuring unit 10. The specific connections by the connection unit are controlled by the control unit 11. The control unit 11 furthermore displays function blocks on the display unit 12, each representing at least one functional unit of the measuring unit 10. The functional units and the connection unit are further described with reference to FIG. 2.

FIG. 2 illustrates a second example block diagram depicting a measuring device, in accordance with example embodiments of the present invention. Here, only the detailed construction of the measuring unit 10 is depicted. A connection unit 20 is connected to a plurality of functional units 21-28. The functional units 20-28 are for example coders and/or baseband processors and/or faders and/or noise generators and/or mappers and/or modulators and/or radio frequency generators and/or digital outputs and/or digital inputs and/or analog outputs and/or analog inputs and/or adders and/or mixers and/or multipliers and/or connectors.

Although in FIG. 2 only a single connection of each functional unit 21-28 to the connection unit 20 is depicted, also more than one connection between a functional unit 21-28 and the connection unit 20 is possible.

The connection unit 20 is configured to connect the functional units 21-28 in different combinations. In this general example, any order of functional units 21-28 can be achieved by use of the connection unit 20. In a more detailed alternative embodiment, the functional units cannot be connected in any order, but restrains regarding the order of connection of the functional units exist.

Figure 3:
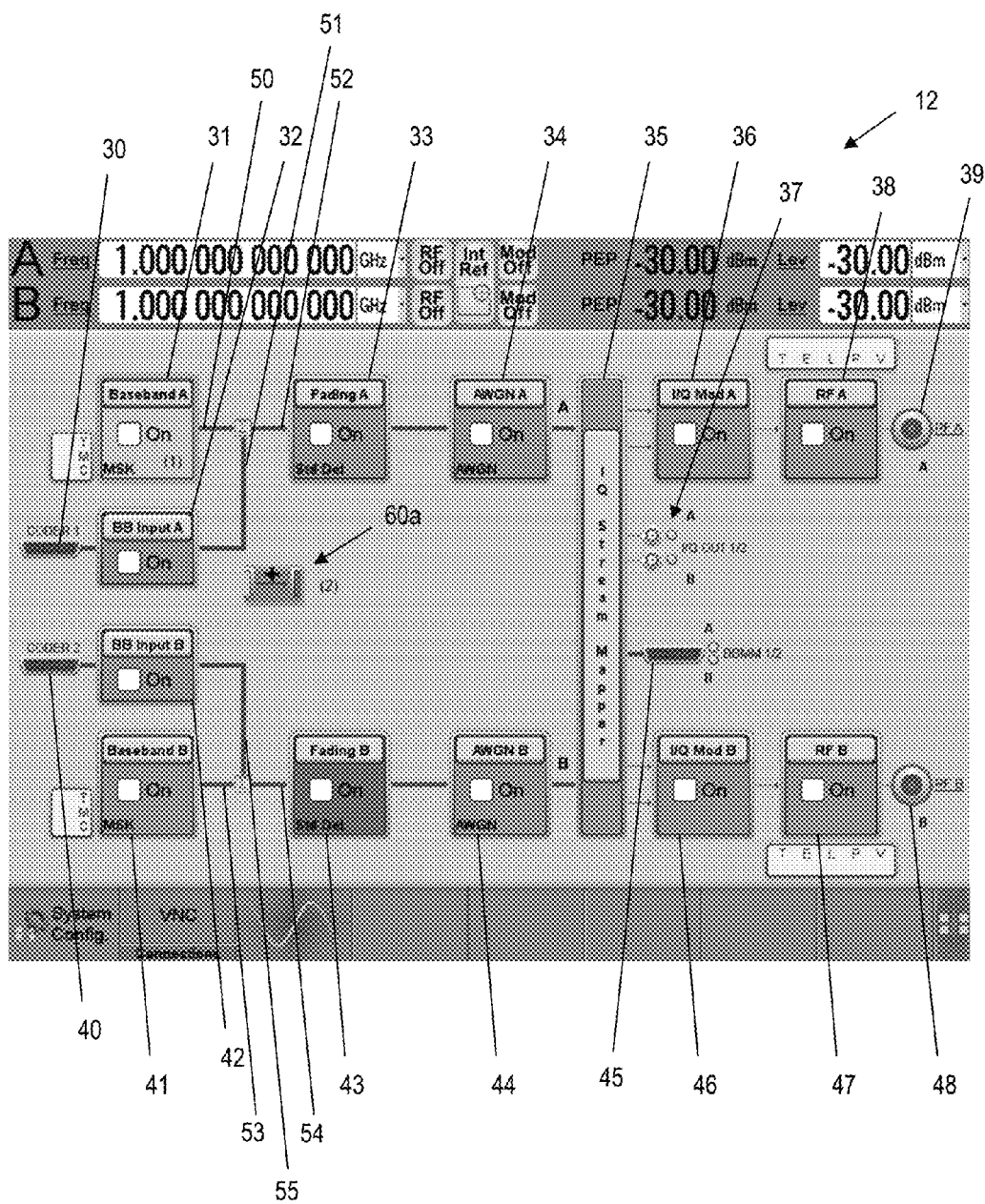
FIG. 3 illustrates a first example of the display content of a display unit of a measuring device, in accordance with example embodiments of the present invention.

FIG. 3 illustrates a first example of the display content of a display unit of a measuring device, in accordance with example embodiments of the present invention. The display unit 12 corresponds to the display unit 12 of FIG. 1. A plurality of function blocks 30-48 is depicted here. Each function block 30-48 corresponds to one or more functional units as described along FIG. 2. Moreover, connections 50-55 between function blocks 31, 32, 33 and 41, 42, 43 are shown.

Connections 50 and 52 connect a function block 31, which is a baseband processing block to a function block 33, which is a fading block. Connections 51 and 52 connect a function block 32, which is a baseband input block to the function block 33. Since the functions blocks 31 and 32 are connected to the same function block 33, the connections 50, 51 meet and are joined to form the connection 52, which enters the function block 33. Correspondingly, the function block 41, which is a baseband processing block is connected to the function block 43, which is a fading block by connections 53 and 54. The function block 42, which is a baseband input block is connected to the function block 43 by connections 54 and 55. As described above, the connections 53, 55 of the function blocks 41, 42 lead to the same function block 43. Therefore, the connections 53, 55 are joined and enter the function block 43 as a combined connection 54. Further connections between function blocks are depicted but not referenced separately.

Moreover, the function blocks 30-48 are depicted in different colors here. The function block 31 is depicted in a first color, while the function block 43 is depicted in a second color. The remaining function blocks 30, 32-42, 44-48 are depicted in a third color.

In the presently shown situation, a user has used the input unit 13 of FIG. 1 to select the function block 31, for example by clicking on the function block 31 by use of a mouse. After doing so, the pointer transforms into a cursor icon 60a as depicted here. The cursor icon 60a shows on its left side the first color, which is identical to the color of the function block 31 and on its right side the second color, which is identical to the color of the function block 43. This indicates, that only a connection of the function block 31 to the function block 43 is possible. In case that connections of the function block 31 to other function blocks than the function block 43 were possible, all function blocks, which are connectable to the function block 31 would be displayed in the second color. In this example though, the function block 31, can only additionally be connected to the function block 43. Therefore only the function block 43 is displayed in the second color.

Instead of a selection of the function block 31 by use of a mouse as input unit 13, also a touch screen can be used. In this case, the selection is performed by a user touching the function block 31.

The cursor icon 60a is in case of using a touch screen as an input unit 13 displayed in such a size, that the colored sections representing the first color and the second color are displayed so far apart, that the finger of a use user moving the cursor icon over the display unit 12 does not completely overlap these color sections. They remain visible when the user finger is touching the touch screen left and right beside the user finger.

Figure 4:
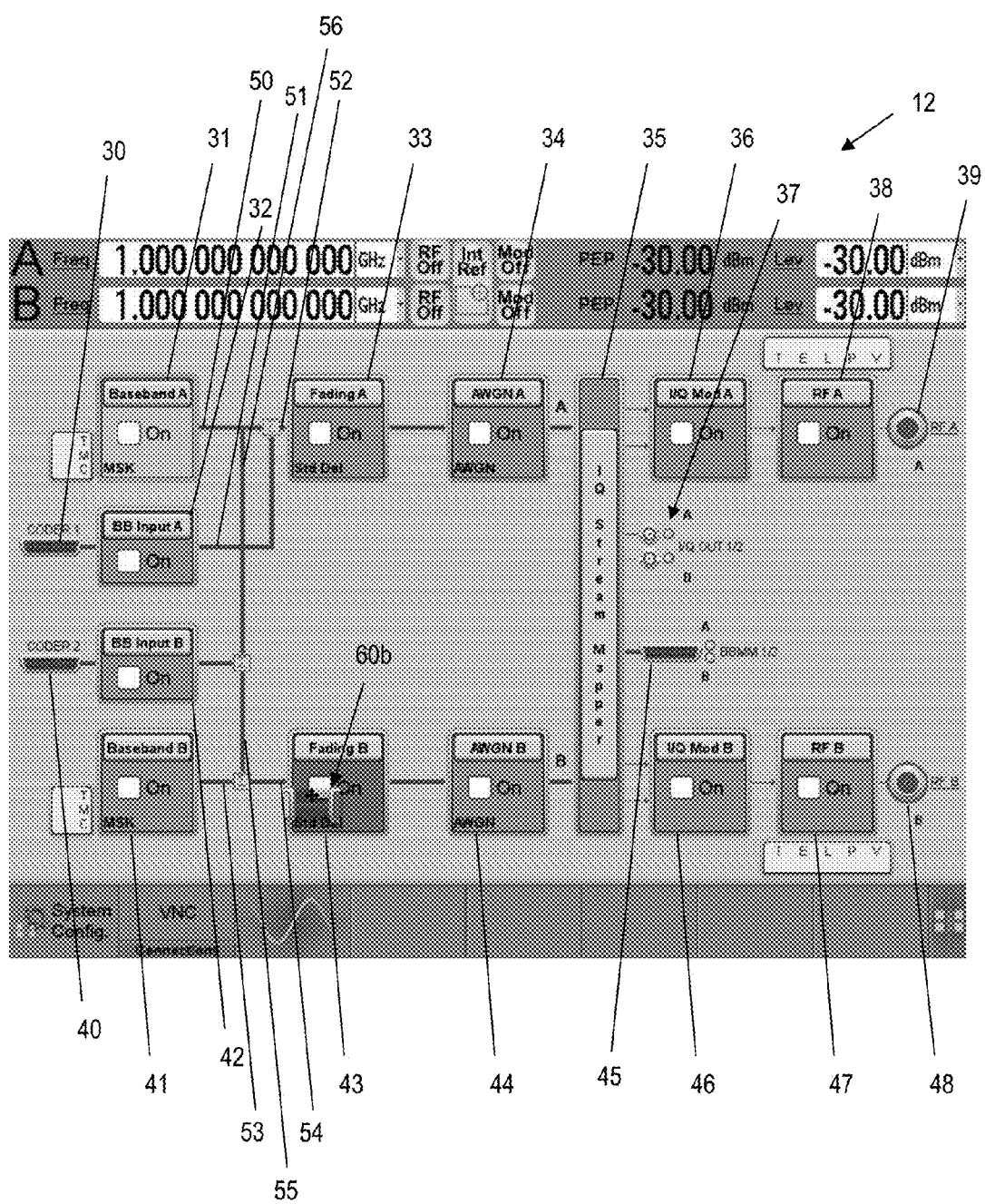
FIG. 4 illustrates a second example of the display content of a display unit of a measuring device, in accordance with example embodiments of the present invention.

FIG. 4 illustrates a second example of the display content of a display unit of a measuring device, in accordance with example embodiments of the present invention. Here, the situation shortly after the situation depicted in FIG. 3 is shown. The cursor icon, here referenced as 60b has been moved to the function block 43. An additional connection 55, leading from the function block 31 to the function block 43 is now shown. This connection has been established by moving the cursor icon 60b to the function block 43. At present this connection is only temporary until the selection of this connection is finalized. This can be done by releasing the mouse button or removing the finger form the touch screen. A result of doing so is shown in FIG. 5.

Figure 5:
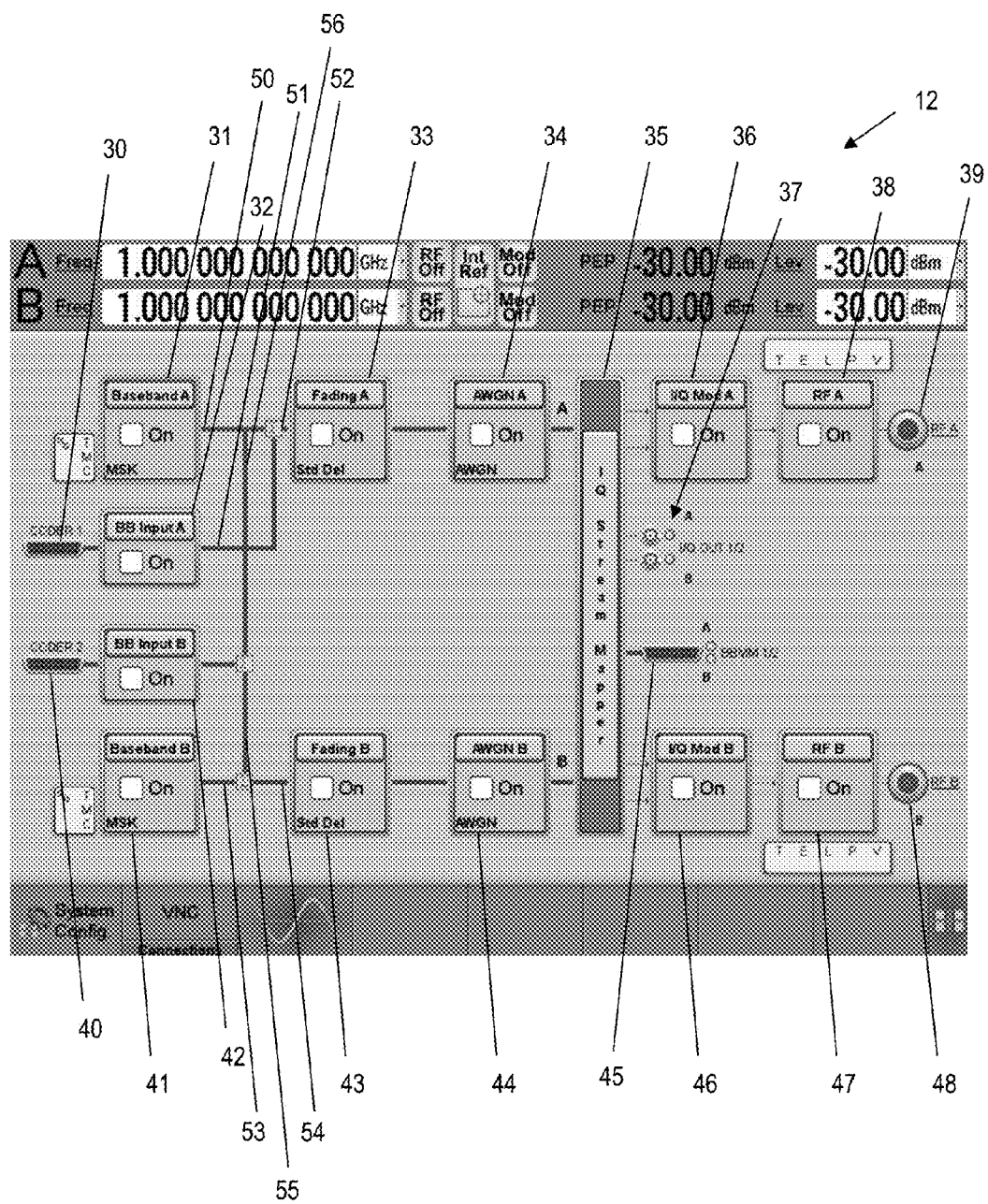
FIG. 5 illustrates a third example of the display content of a display unit of a measuring device, in accordance with example embodiments of the present invention.

FIG. 5 illustrates a third example of the display content of a display unit of a measuring device, in accordance with example embodiments of the present invention. Here, the situation after releasing the mouse button or moving the finger from the touch screen starting from the situation depicted in FIG. 4 is shown. Now all function blocks 30-48 are displayed in the same color. The connection 56 is finalized.

Figure 6:
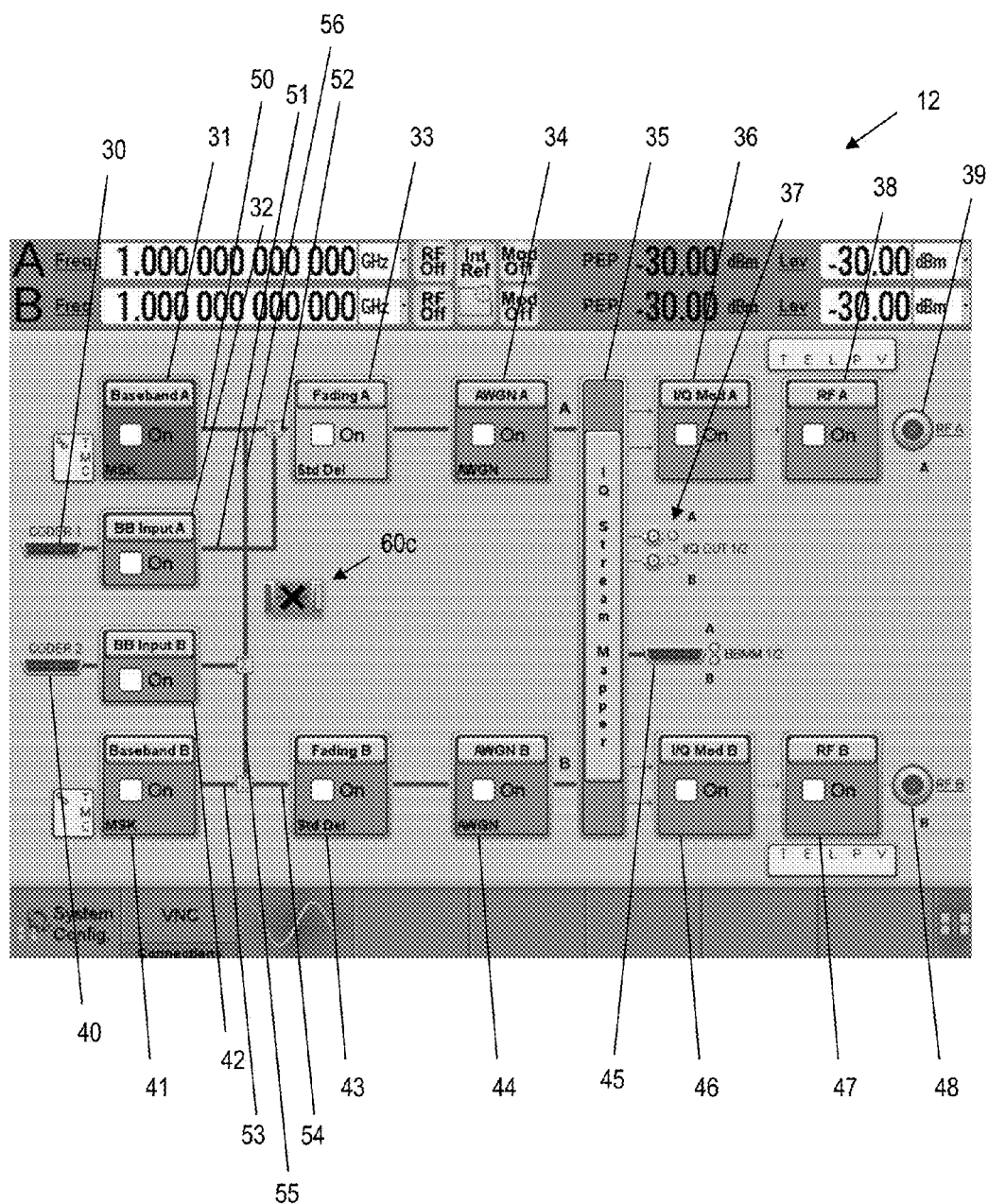
FIG. 6 illustrates a fourth example of the display content of a display unit of a measuring device, in accordance with example embodiments of the present invention.

FIG. 6 illustrates a fourth example of the display content of a display unit of a measuring device, in accordance with example embodiments of the present invention. In this situation, the connection 56 is present, as explained along FIGS. 3-5. In order to disconnect this connection, a user has now selected the function block 33. By doing so, the cursor icon has transformed to the cursor icon 60c. The cursor icon 60c is on its right side displayed in a first color, while the function block 33 is also displayed in this first color. The left side of the cursor icon 60c is displayed in a second color, in which also the function block 31 is depicted. The coloring of the cursor icon 60c indicates that in the present situation, only the connection 15 to the function block 33 can be removed.

Figure 7:
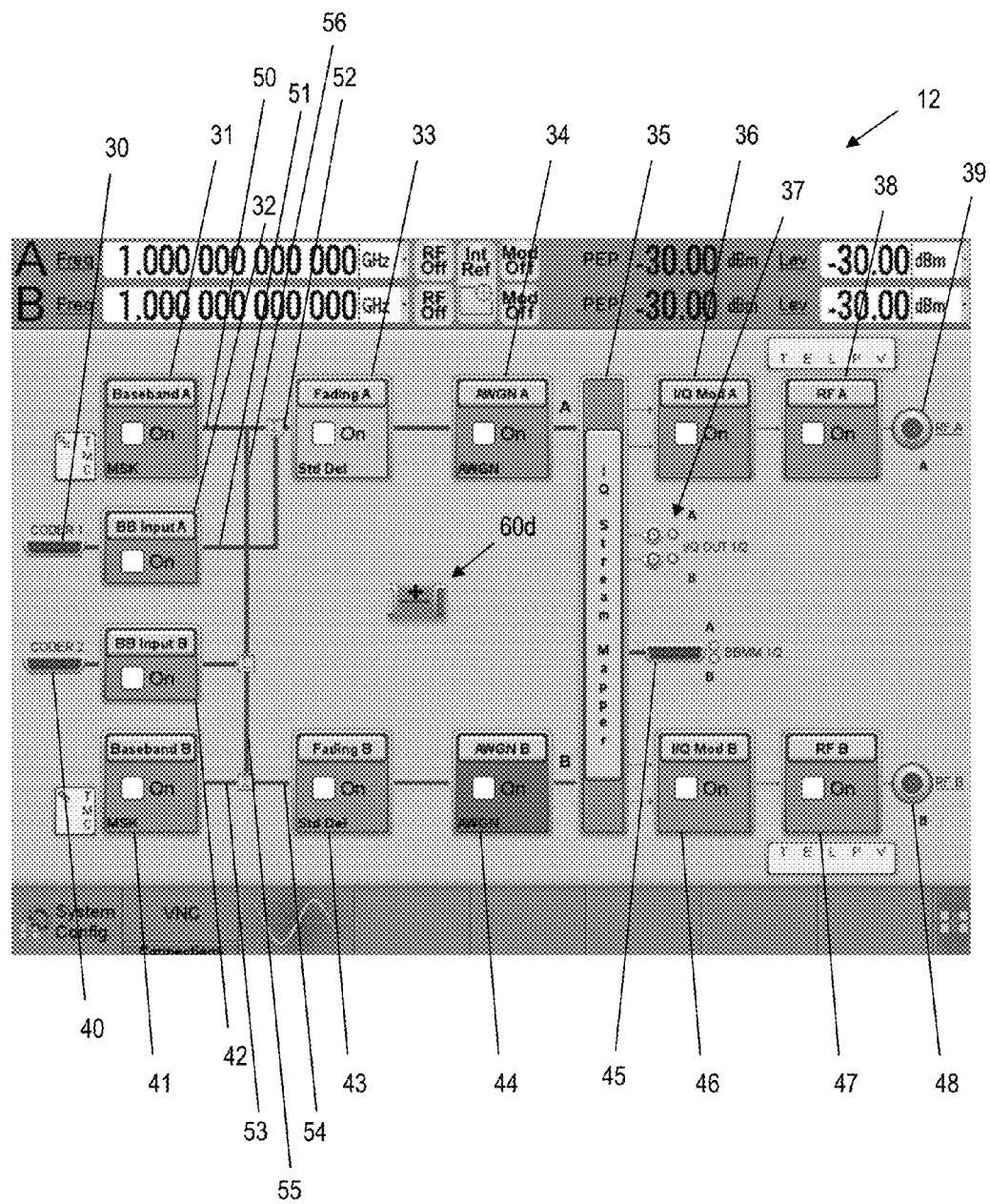
FIG. 7 illustrates a fifth example of the display content of a display unit of a measuring device, in accordance with example embodiments of the present invention.

FIG. 7 illustrates a fifth example of the display content of a display unit of a measuring device, in accordance with example embodiments of the present invention. Here, a user has selected the function block 33 resulting in a transformation of the cursor icon to the cursor icon 60d depicted here. The function block 33 is depicted in a first color, while the function block 44 is depicted in a second color. All other function blocks 30-32, 34-43, 46-48 are depicted in a third color. The left part of the cursor icon 60d is depicted in the first color, while the right side of the cursor icon 60d is depicted in the second color. The coloring of the cursor icon 60d indicates that the first selected function block 33 can only be connected to the function block 44 directly.

Figure 8:
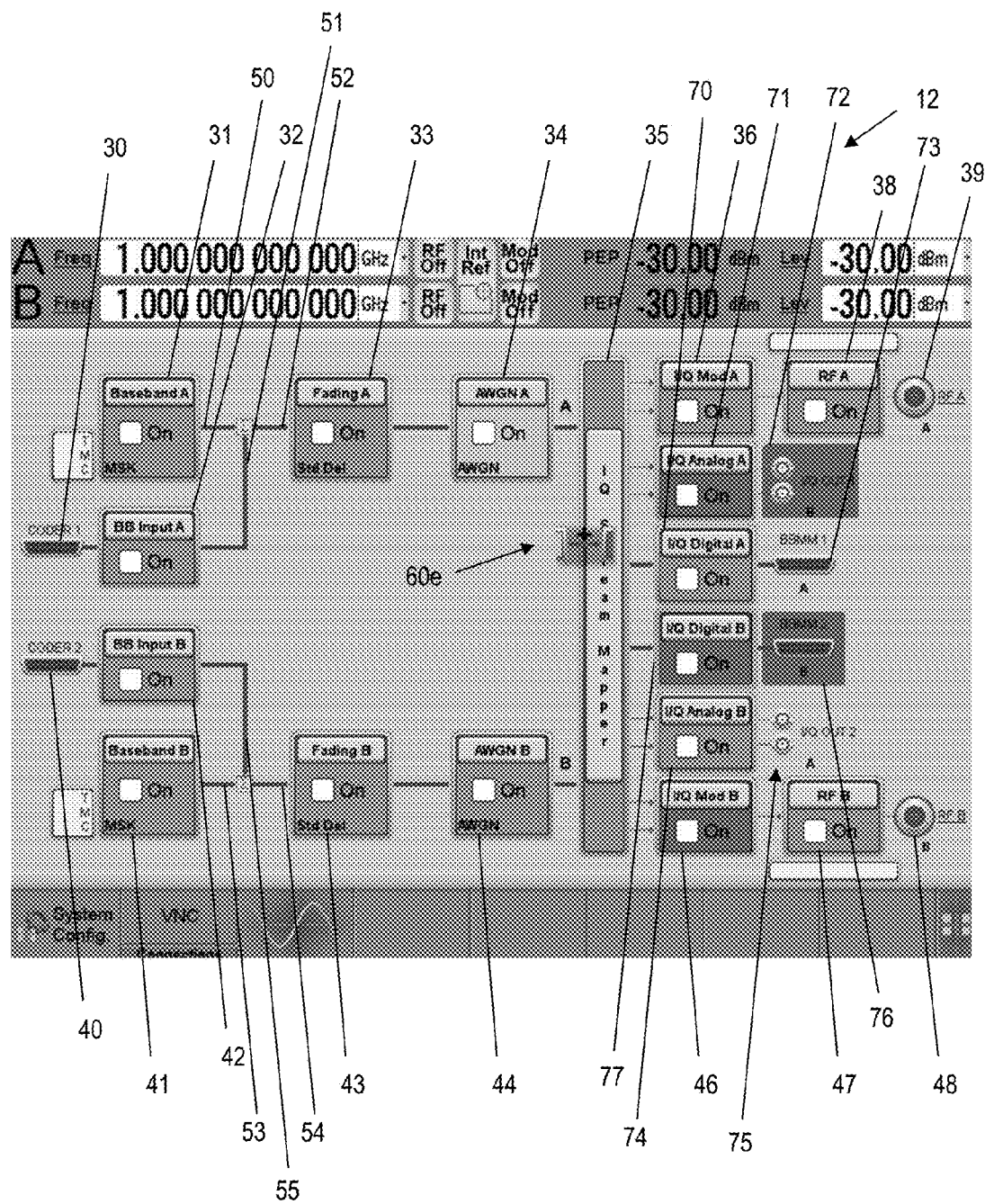
FIG. 8 illustrates a sixth example of the display content of a display unit of a measuring device, in accordance with example embodiments of the present invention.

FIG. 8 illustrates a sixth example of the display content of a display unit of a measuring device, in accordance with example embodiments of the present invention. In this situation, a user has selected the function block 34, which is depicted in a first color leading to the cursor icon 60e being displayed in the first color on its left side. Additional function blocks 70-77 are present in this embodiment. A connection of the function block 34 to the function blocks 71, 72, 46, 76 and 77 is possible. These function blocks are displayed in a third color. The right side of the cursor icon 60e is also displayed in this third color, indicating that connections of the function block 34 to the function blocks 71, 72, 46, 76, 77 are possible.

Figure 9:
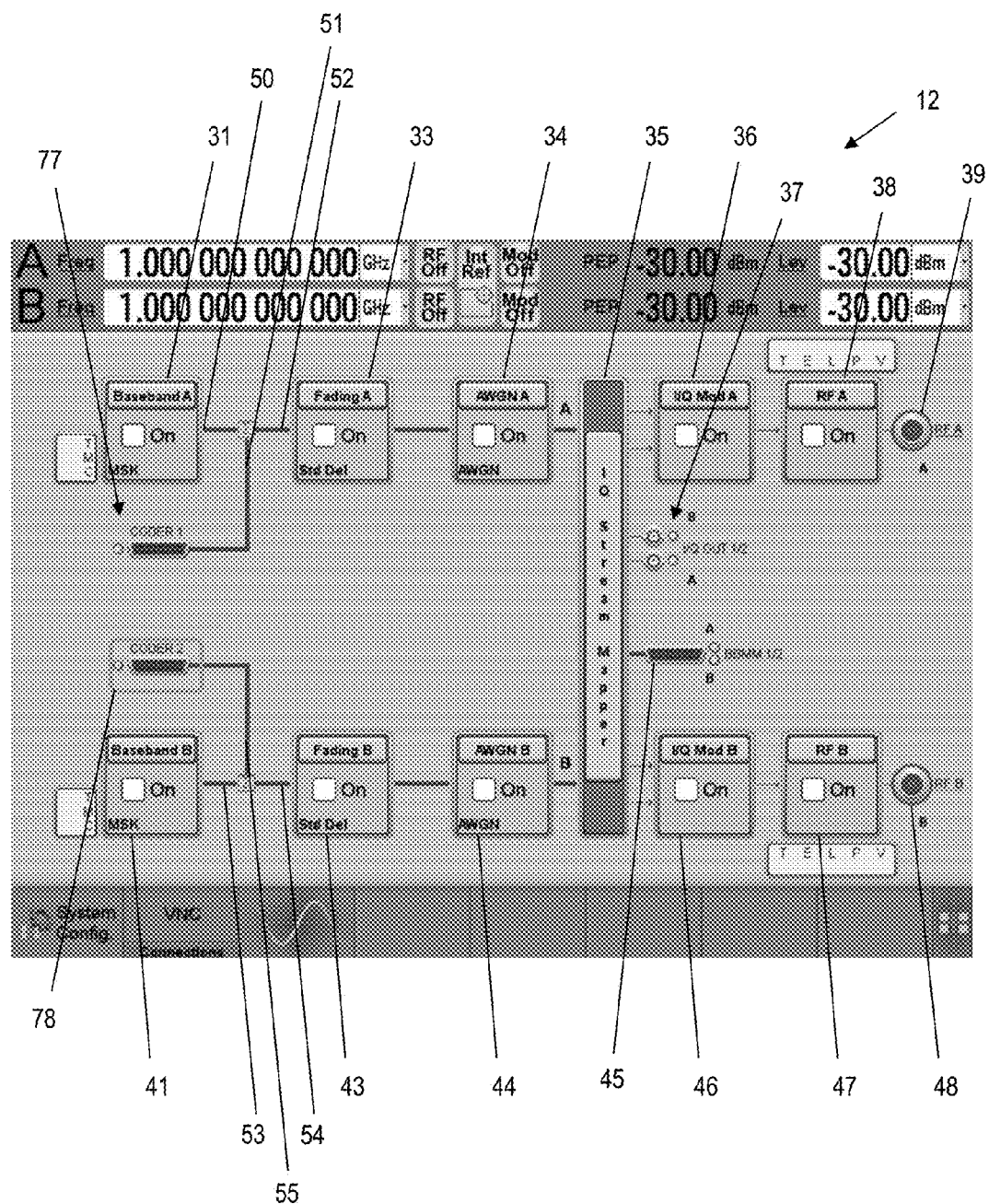
FIG. 9 illustrates a seventh example of the display content of a display unit of a measuring device, in accordance with example embodiments of the present invention.

FIG. 9 illustrates a seventh example of the display content of a display unit of a measuring device, in accordance with example embodiments of the present invention. In this example, additional function blocks 77, 78 are present. The function block 77, 78 each represent at least two functional units, as described in FIG. 2. In order to expand one of the function blocks 77, 78, it is necessary to issue an expand command, for example by clicking on the function block 77, 78, or a part of the function block 77, 78. A result of such an action can be seen in FIG. 10. Alternatively, this can be achieved by touching the function block 77, 78 when using a touch screen.

Figure 10:
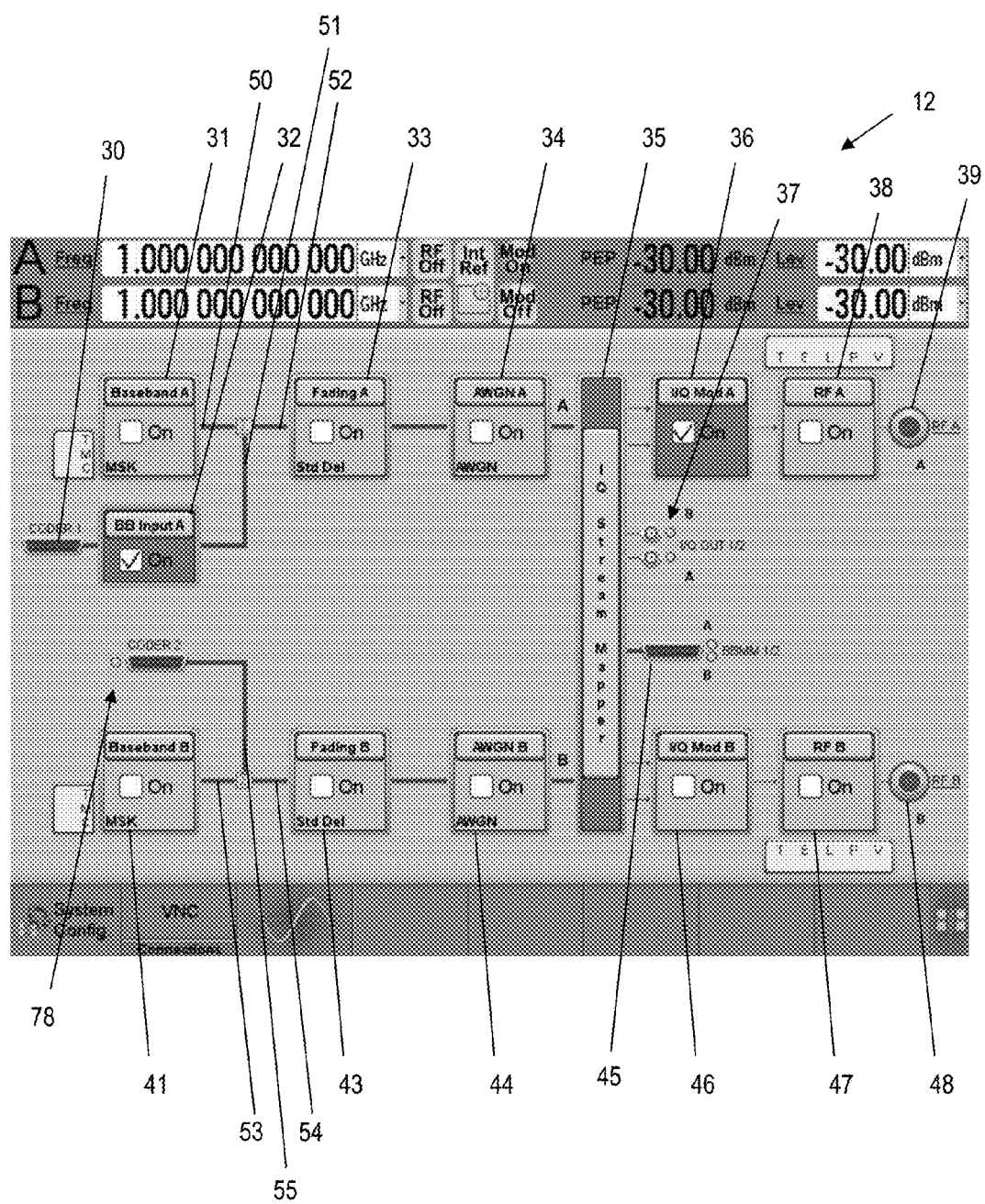
FIG. 10 illustrates an eighth example of the display content of a display unit of a measuring device, in accordance with example embodiments of the present invention.

FIG. 10 illustrates an eighth example of the display content of a display unit of a measuring device, in accordance with example embodiments of the present invention. The situation depicted here shows the function block 77 of FIG. 9 in its expanded state. Here, the function blocks 30, 32 replace the function block 77. In order to collapse the function blocks 30, 32 again, a collapse command can be issued by the user. This can for example be a click or a touch of a respective section of one of the function blocks 30, 32. Also, the function blocks 37 and 45 are such collapsed function blocks. For example in FIG. 8, one can easily see that the function block 37 has been replaced by the function blocks 71, 72, which are the expanded function blocks corresponding to the function block 37. The same is true for the function block 45, which is expanded to the function blocks 76 and 77 in FIG. 8. Also the function block 37, 45 can be expanded by issuing an expand command. This results in the display changing regarding these function blocks to the display of FIG. 8. Such an expanding action is shown in FIG. 11.

To initiate an expansion of a function block, it is advantageously sufficient to move the cursor icon above this function block. Automatically, the function block is expanded to show the underlying function blocks. In case no interaction is performed with this function block except expanding it, the function block advantageously automatically is collapsed to the previous form, if the cursor icon is moved away from the function block again.

The expansion and the collapsing of function blocks advantageously have no effect on the activity of the function block itself. Even if a previously active function block corresponding to several functional units is collapsed, the individual functional units remain active.

Figure 11:
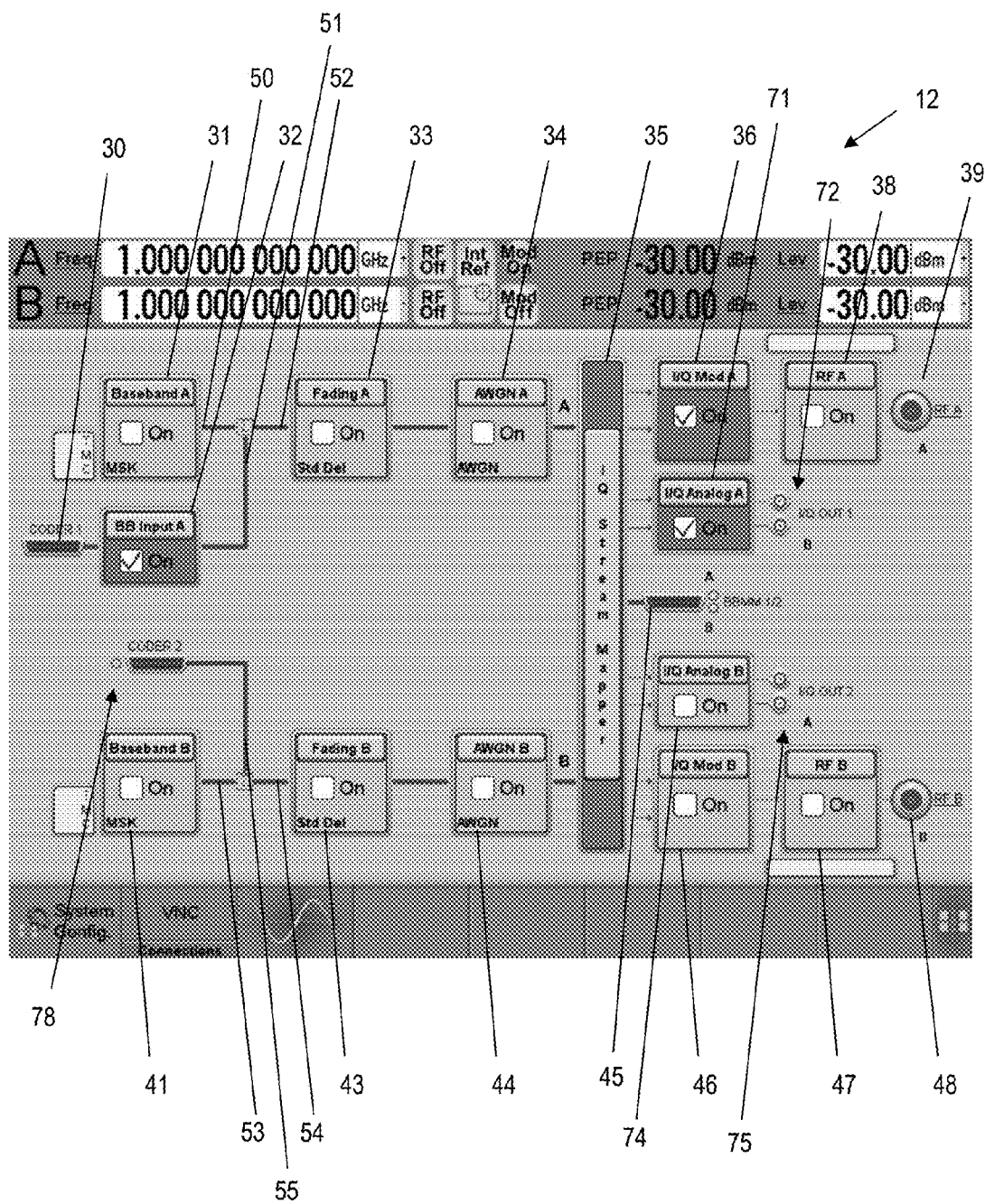
FIG. 11 illustrates a ninth example of the display content of a display unit of a measuring device, in accordance with example embodiments of the present invention.

FIG. 11 illustrates a ninth example of the display content of a display unit of a measuring device, in accordance with example embodiments of the present invention. Here, the situation of FIG. 10 after an expand command regarding the function block 37 is shown. The function block 37 is expanded to the function blocks 71 and 72.

Figure 12:
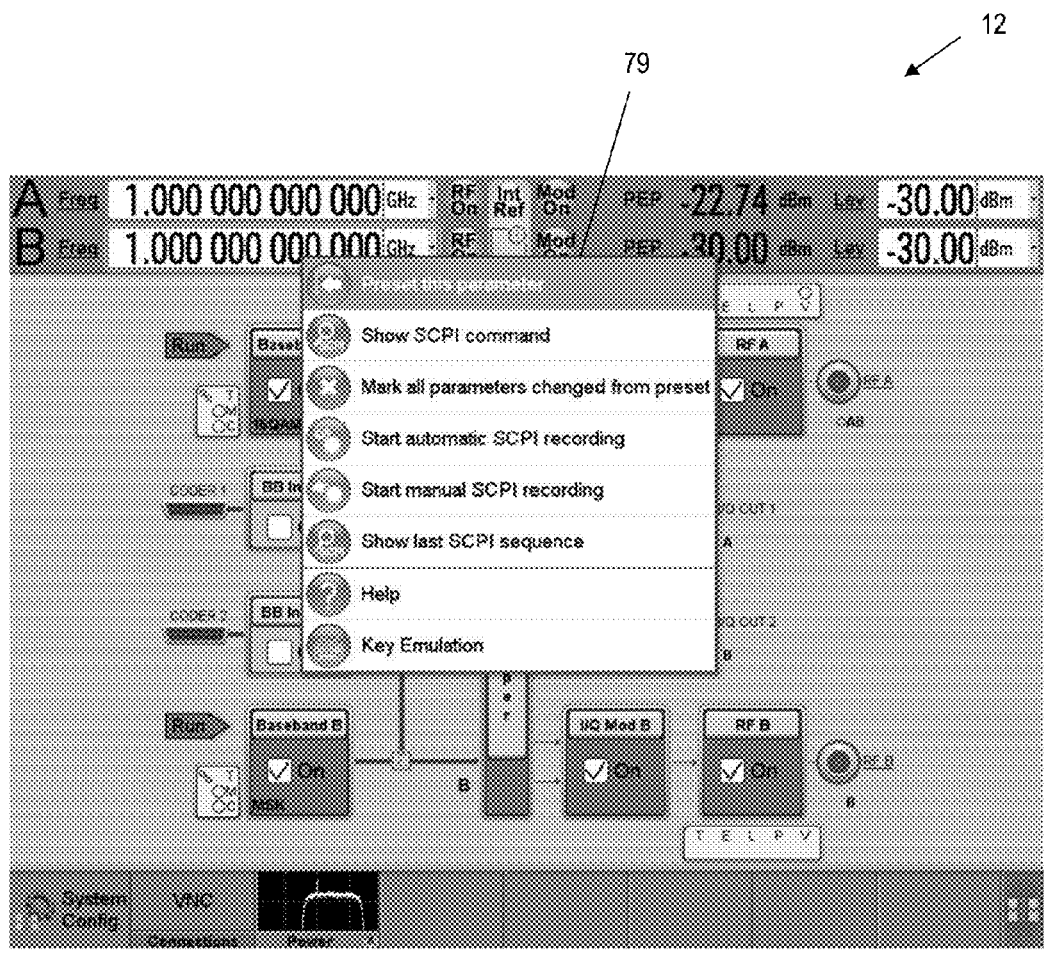
FIG. 12 illustrates a tenth example of the display content of a display unit of a measuring device, in accordance with example embodiments of the present invention.

FIG. 12 illustrates a tenth example of the display content of a display unit of a measuring device, in accordance with example embodiments of the present invention. Here, a number of function blocks, which are not referenced separately are displayed. After selecting a function block or a graphical element displayed on the display unit 12, and after issuing a context menu command, for example by clicking on the respective function block or graphical element using a right mouse button or by holding the finger on the touch screen for a certain duration, a context menu 79 regarding the targeted function block or graphical element is opened. This context menu contains commands relevant to this specific function block or graphical element. These commands can be selected using the input unit.

Advantageously, the context menu can comprise a great number of individual entries. In case the great number of entries does not fit on the display unit 12 without scrolling, a scrolling of the context menu items is possible. When reaching an upper or lower end of the list of scrollable entries of the context menu 79, the end of the list is indicated, for example by a graphical effect, such as a wobble of the context menu or by a sound effect, such as a clicking or a rattling.

Figure 13:
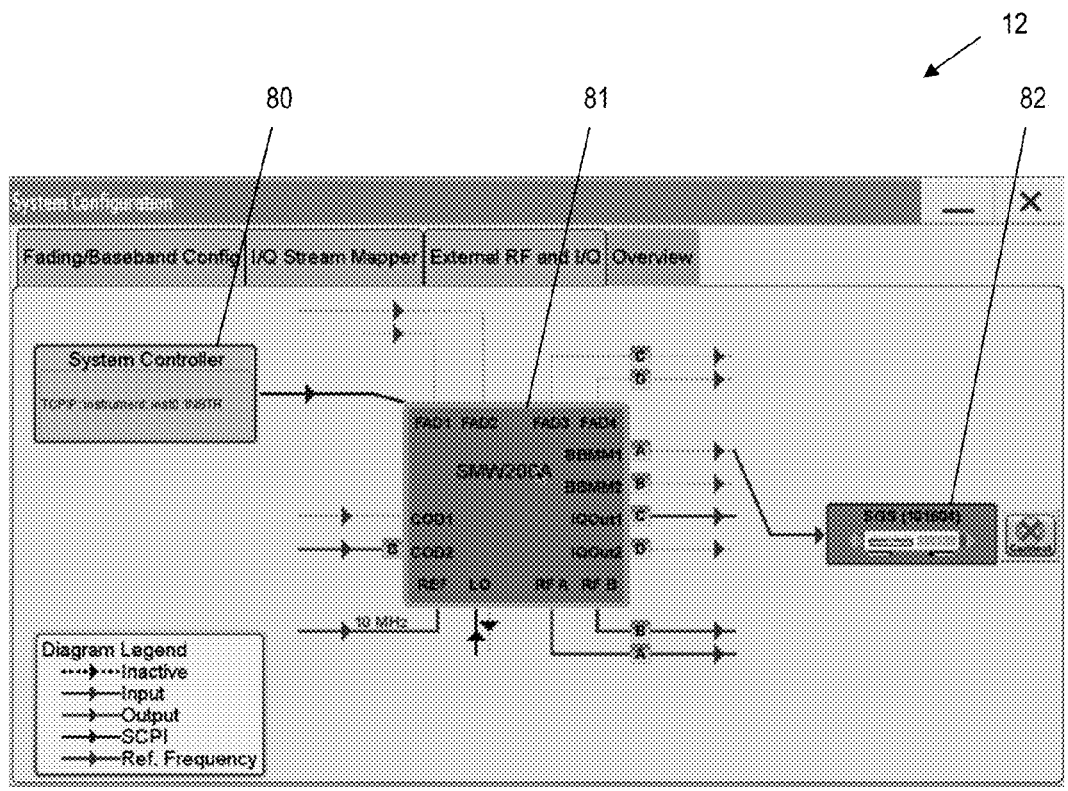
FIG. 13 illustrates an eleventh example of the display content of a display unit of a measuring device, in accordance with example embodiments of the present invention.

FIG. 13 illustrates an eleventh example of the display content of a display unit of a measuring device, in accordance with example embodiments of the present invention. Here, function blocks 80, 81 and 82 and according connections connecting them, are shown. Here, each function block 80, 81, 82 corresponds to a distinct piece of measurement equipment. The function block 80 corresponds to a system controller, the function block 81 corresponds to a measuring device and the function block 82 corresponds to a signal generator. Therefore not only functional units of a single measuring device can be depicted by the display unit 12 but also functional units of different measuring devices comprised by a measuring system can be shown. Each function block can represent one or more functional units up to each function block representing an entire measuring device. In an even more abstract form, only one single function block representing the entire measuring system could be depicted.

The function blocks 80-82 depicted here, can be interacted with just as the function blocks shown in the prior figures. By expanding one of the here-depicted function blocks, the underlying function blocks corresponding to the individual functional units can be targeted.

Figure 14:
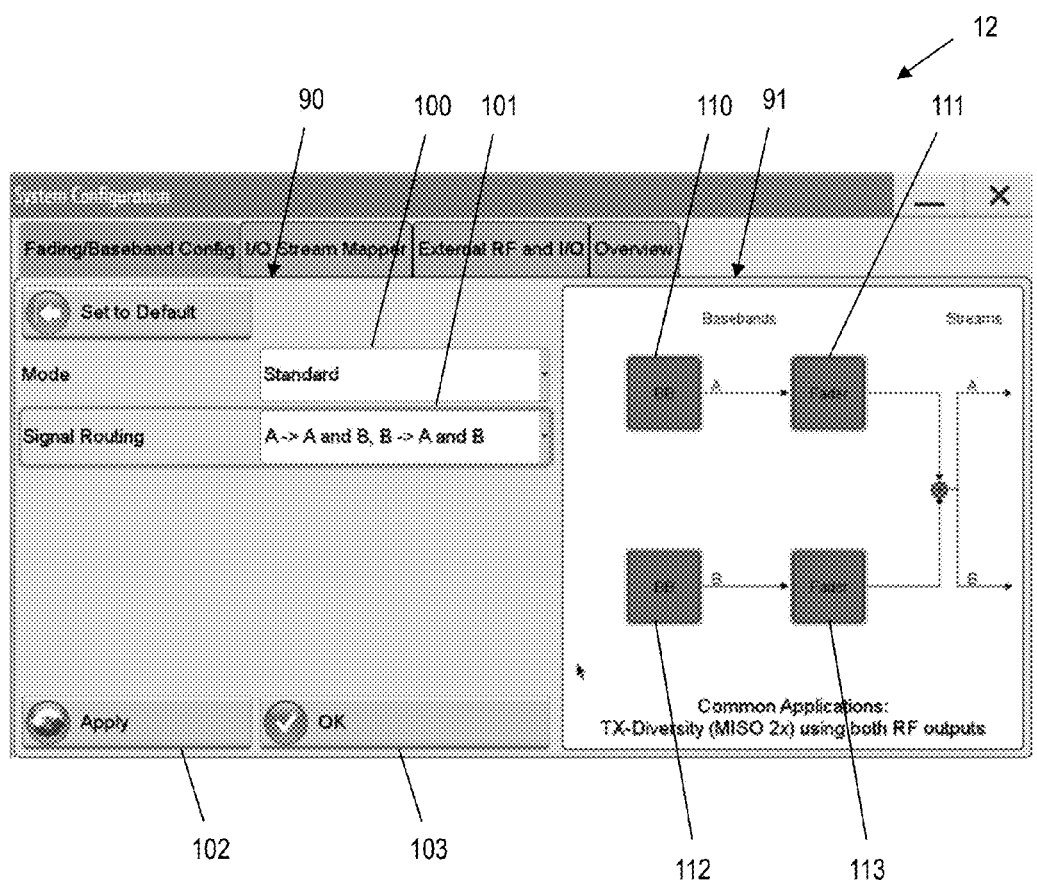
FIG. 14 illustrates a twelfth example of the display content of a display unit of a measuring device, in accordance with example embodiments of the present invention.

FIG. 14 illustrates a twelfth example of the display content of a display unit of a measuring device, in accordance with example embodiments of the present invention. Here, a selection window 90 and a preview window 91 are shown. The selection window 90 comprises dialog elements 100, 101, 102, 103 for selecting different function block layouts. The preview window 91 shows a function block layout corresponding to the settings entered in the selection window 90. Here, function blocks 110, 111, 112 and 113 are depicted.

By selecting a specific function block layout using the dialog elements 100-103, the selected function block layout is depicted in the preview window 91. By afterwards pressing the OK-button 103, the selected function block layout is approved. The function blocks 110-113 are afterwards depicted for example as shown in FIGS. 3-11.

Figure 15:
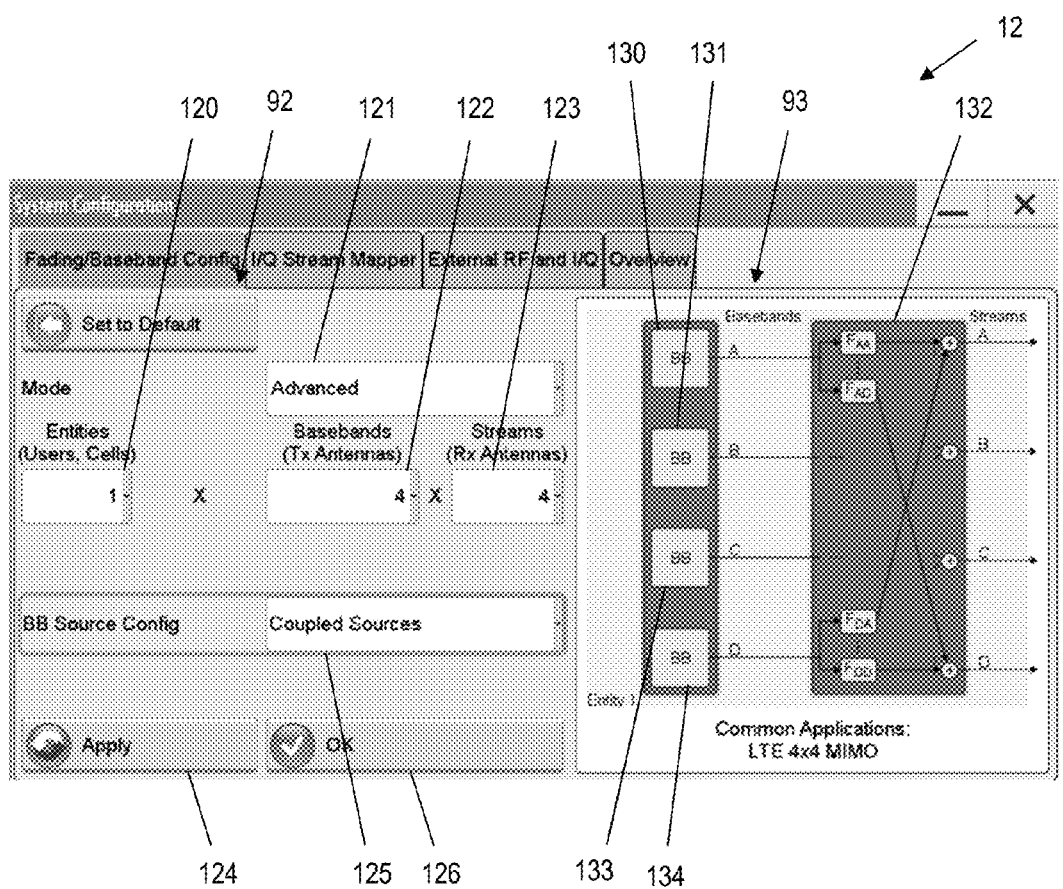
FIG. 15 illustrates a thirteenth example of the display content of a display unit of a measuring device, in accordance with example embodiments of the present invention.

FIG. 15 illustrates a thirteenth example of the display content of a display unit of a measuring device, in accordance with example embodiments of the present invention. Also here, a selection window 92 and a preview window 93 are shown. The selection window comprises dialog elements 120-126, while the preview window shows function blocks 130-134.

By selecting a specific function block layout in the selection window 92 by use of the dialog elements 120-126, a preview of the selected function block layout can be displayed in the preview window 93. Especially when selecting the advanced mode by use of the dialog element 121, a change of the selection window from the selection window 90 depicted in FIG. 14 to the selection window 92 depicted in FIG. 15 is achieved. More options can be selected from then.

Additionally, when displaying the image content as shown in FIGS. 3-15, it is possible to perform a zoom-action, for example by using a mouse-wheel or by using a two-finger zoom gesture for enlarging the content of the display. In case of such a zoom-action having been performed, advantageously, an overview-window is shown in addition to the zoomed display content. This overview-window comprises a significantly size-reduced version of the entire display content prior to zooming and an indication, which section of the prior display content the presently zoomed-in state corresponds to.

Advantageously, function blocks comprise activity indicators. Such an activity indicator indicates, if the function block is presently active. For example, an activity indicator could be a highlighted section of the function block or the display of the function block with a specific color and/or texture and/or appearance.

Figure 16:
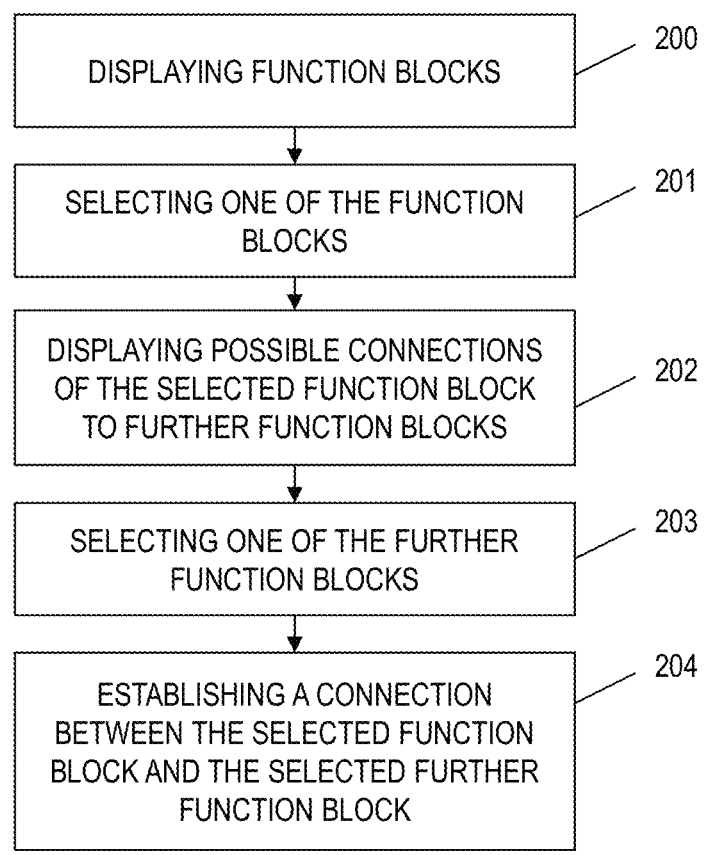
FIG. 16 illustrates a flow chart depicting a method of operating a measuring device, in accordance with example embodiments of the present invention.

FIG. 16 illustrates a flow chart depicting a method of operating a measuring device, in accordance with example embodiments of the present invention. In a first step 200, function blocks each corresponding to at least one functional unit of a measuring device are displayed on a display unit of measuring device. In a second step 201 one of the displayed function blocks is selected by a user, for example by use of a mouse or a touch screen as an input device. In a third step 202, possible connections of the selected function blocks to further function blocks are depicted. These possible connections are highlighted for example by displaying a cursor icon at least in part in the color of the selected function block and at least in part in the color of further function blocks, which can be connected. In a fourth step 203, the user now selects one of the further function blocks, a connection from the selected function block is possible with. In a final fifth step 204, a connection between the selected function block and the selected further function block is established.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to a network analyzer as the measuring device. The characteristics of the exemplary embodiments can be used in any combination.

Although the present invention and its advantages have been described in detail, it should be understood, that various changes, substitutions and alterations can be made herein without departing from the spirit and scope of the invention as defined by the appended claims.

The invention claimed is:

1. A measuring device comprising:
   a controller;
   a display;
   a user interface; and
   a plurality of functional elements configured to be selectively interconnected in any one of a plurality of configurations of the measurement device,
   wherein the controller is configured to control the display to display a plurality of function blocks, each respectively corresponding to at least one of the functional elements,
   wherein the user interface is configured to receive one or more user inputs to control the selective interconnection of the functional elements in a one of the plurality of configurations by means of connections amongst the plurality of function blocks,
   wherein a first of the user inputs triggers a selection of a one of the plurality of function blocks, and
   wherein, upon the selection of the one function block, the controller is further configured to control the display to display an indication of one or more possible connections between the selected one function block and one or more further of the function blocks to which the selected one function block can operably be connected, wherein the one or more possible connections are indicated by displaying the selected one function block in a first manner, displaying the one or more further function blocks, to which the selected one function block can operably be connected, in a second manner, and displaying a cursor icon partially in the first manner and partially in the second manner.

2. The measuring device according to claim 1, wherein the first manner comprises one or more of a first color, a first texture and a first appearance, and the second manner comprises one or more of a second color, a second texture and a second appearance.

3. The measuring device according to claim 1,
wherein the controller is configured to control the display to display the selective interconnection of the functional elements as interconnections between the respective corresponding function blocks;
wherein a second of the user inputs triggers a temporary selection of a one of the one or more possible connections consisting of a connection between the the selected one function block and a one of the further function blocks to which the selected one function block can be connected, and
wherein, upon the temporary selection of the one connection, the controller is further configured to control the display to display the connection between the selected one function block and the one further function block, and to continue to display the selected one function block in the first manner, the one further function block connected by the temporary selected connection in the second manner, and the cursor icon partially in the first manner and partially in the second manner.

4. The measuring device according to claim 3, wherein a seventh of the user inputs triggers a finalization of the temporary selection of the one of the one or more possible connections, wherein controller is further configured to control the display to continue displaying the connection between the selected one function block and the one further function block, and to display all of the plurality of function blocks in a same manner.

5. The measuring device according to claim 1, wherein the plurality of functional elements include one or more of coders, baseband processors, faders, noise generators, mappers, modulators, radio frequency generators, digital outputs, digital inputs, analog outputs, analog inputs, adders, mixers, multipliers and connectors.

6. The measuring device according to claim 1, wherein the plurality of function blocks include one or more of coding blocks, baseband blocks, fading blocks, noise blocks, mapping blocks, modulator blocks, radio frequency blocks, digital output blocks, digital input blocks, analog output blocks and analog input blocks.

7. The measuring device according to claim 1,
wherein one of the plurality of function blocks corresponds to a combination of at least two functional elements, and
wherein a third of the user inputs triggers an expanding of the one of the plurality of function blocks that corresponds to the combination of at least two functional elements, wherein the controller is further configured to control the display to display additional function blocks instead of the one function block being expanded, each corresponding to a respective one of the at least two functional elements of the expanded one function block.

8. The measuring device according to claim 7, wherein a fourth of the user inputs triggers a collapsing the expanded one function block, wherein the controller is further configured to control the display to display the one of the plurality of function blocks that corresponds to the combination of at least two functional elements instead of the additional function blocks.

9. The measuring device according to claim 1,
wherein a fifth of the user inputs triggers display of a context menu corresponding to a targeted one of the plurality of function blocks, wherein the controller is further configured to control the display to display a context menu corresponding to the targeted function block.

10. The measuring device according to claim 1,
wherein a selection window displaying different function block layouts that can be selected is displayed on the display,
wherein a sixth of the user inputs triggers a selection of a one of the function block layouts displayed in the selection window, and wherein the controller is further configured to control the display to display a preview window showing the selected one function block layout.

11. The measuring device according to claim 1,
wherein the controller is further configured to detect one or more ambiguities regarding an establishment or a deletion of at least one connection between function blocks, and
wherein, when the controller detects at least one ambiguity, the controller is further configured to control the display to display one or more of a warning message and a dialog requesting clarification of the at least one ambiguity.

12. A measuring system comprising a first measuring device according to claim 1 and at least one further measuring device,
wherein one or more of the plurality of function blocks correspond to one or more respective ones of the functional elements of the first measuring device, and
wherein one or more of the plurality of function blocks correspond to one or more respective further ones of the functional elements of at least one of the at least one further measuring device.

13. The measuring system according to claim 12, wherein the one or more user inputs control the selective interconnection of the functional elements of the first measuring device and the functional elements of one or more of the at least one further measuring device.

14. A measuring method comprising:
displaying, on a display of a measuring device, a plurality of function blocks, each corresponding to at least one of a plurality of functional elements of the measuring device, wherein a selective interconnection of the functional elements in any one of a plurality of configurations of the measuring device is controlled by means of connections amongst the plurality of function blocks;
selecting a one of the plurality of function blocks;
displaying, on the display, an indication of one or more possible connections between the selected one function block and one or more further of the function blocks to which the selected one function block can be operably connected, wherein the one or more possible connections are indicated by displaying the selected one function block in a first manner, displaying the one or more further function blocks, to which the selected one function block can operably be connected, in a second manner, and displaying a cursor icon partially in the first manner and partially in the second manner; and
selecting a one of the one or more further function blocks to which the selected one function block can be connected, which establishes a connection between at least one of the at least one functional element corresponding to the selected one function block and at least one of the at least one functional element corresponding to the selected one further function block.

15. The measuring method according to claim 14, wherein the first manner comprises one or more of a first color, a first texture and a first appearance, and the second manner comprises one or more of a second color, a second texture and a second appearance.

* * * * *